United States Patent Office 2,802,810
Patented Aug. 13, 1957

2,802,810

N,N-BIS-(HYDROXY-DIALKYL-BENZYL)-ALKYL-AMINES AS RUBBER ANTIOXIDANTS

John C. Bill, Middlebury, Conn., assignor to United States Rubber Company, New York, N. Y., a corporation of New Jersey No Drawing. Application May 28, 1954,
Serial No. 433,273

6 Claims. (Cl. 260—45.9)

This invention relates to improvements in antioxidants.

According to the invention, the deterioration of unsaturated organic materials which are susceptible to deterioration by heat, light and air (oxygen or ozone) is retarded by incorporating therewith an antioxidant amount of a compound derived from reacting two mol. proportions of a phenol of the formula

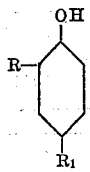

with one mol. proportion of a dimethylolamine of the formula $R'N(CH_2OH)_2$ where $R'$ is alkyl, alkenyl, cycloalkyl, or hydroxy alkyl. In the above phenol, the R and $R_1$ groups are alkyl groups. In such a case, the phenol has but one active position for reaction with the dimethylolamine and this position is the remaining free ortho position.

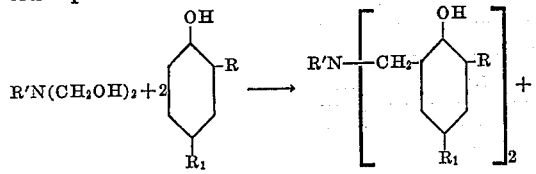

This requirement of only one reactive position leads to the formation of monomeric products of reaction, usually crystalline, in contrast to products formed from formaldehyde, amines and phenols having two or three active positions which products are polymeric in nature.

The dimethylolamine is derived from 2 mol. proportions of formaldehyde and 1 mol. proportion of a primary aliphatic amine as exemplified by methylamine, ethylamine, n-propylamine, isopropylamine, allylamine, methallylamine, n-butylamine, sec.-butylamine, tert-butylamine, n-heptylamine, n-octylamine, ethanolamine, cyclohexylamine. In general, any aliphatic primary amine is susceptible to reaction with formaldehyde.

Exemplary of the phenols are:

2,4-dimethyl phenol
2,4-diethyl phenol
2,4-dipropyl phenol
2,4-di-tert-butyl phenol
2-heptyl 4-n-propyl phenol
2-nonyl 4-methyl phenol
2-tert-butyl 4-methyl phenol
2-hexyl 4-ethyl phenol
2-isopropyl 4-methyl phenol
2-allyl 4-methyl phenol.

The present antioxidants are generically named N,N-bis-(hydroxy-dialkyl-benzyl)-alkyl amines.

The present chemicals have special and distinctive use in the protection of uncured and cured natural rubber and the synthetic rubbers that are made by the copolymerization of butadiene and styrene (GR–S) and of butadiene and acrylonitrile (GR–A). Other rubbery materials include gutta percha, balata, polybutadiene, polyisoprene, copolymers of isoprene with styrene or with acrylonitrile or with isobutylene, polychloroprene, butadiene-vinylpyridine rubber and butadiene-methyl methacrylate rubber. The chemicals stabilize the rubbers against the surface cracking effects of light such as sunlight. Accordingly, the expression "a rubber" refers to such natural and artificial rubbers which are similarly subject to the deteriorating influences of heat, light and/or oxygen.

The following examples, in which the parts are by weight, are given to illustrate the invention.

PREPARATION OF ANTIOXIDANTS

EXAMPLE 1

(a) *N,N-bis-(2-hydroxy-3-tert-butyl-5-methyl benzyl)-methylamine*

Formalin (37% formaldehyde) (25 gms., 0.306 mol.) was treated portionwise with methylamine solution (25% methylamine) (19 gms., 0.153 mol.) in 50 cc. of methanol, with cooling and stirring. To this, a methanol solution (100 cc.) containing o-tert-butyl-p-cresol (50 gms., 0.305 mol.) was added. The stirring was continued at room temperature for 16 hours. It was then heated for 4 hours at 60° C. and decolorized with carbon black. The black was filtered off and water and the solvent were then removed under vacuum and on cooling the product crystallized to a white crystalline solid (53 gms., 92%), M. P. 112–3° C. Purification gave a product melting at 113–113.5° C.

Calcd. for $C_{25}H_{37}O_2N$; N, 3.65. Found: N, 3.99, 3.84.

(b) *N,N-bis-(2-hydroxy-3-tert-butyl-5-methyl benzyl)-cyclohexylamine*

Cyclohexylamine (30.5 gms., 0.305 mol.) was dissolved in methanol (50 cc.) and added dropwise to formalin (48.7 gms., 0.610 mol. formaldehyde) with stirring and cooling. Twenty minutes after the addition was complete, a methanol solution (100 cc.) of o-tert-butyl-p-cresol (100 gms., 0.610 mol.) was added dropwise with stirring and cooling. After the addition was complete, the solution was refluxed gently for 16 hours. Benzene (200 cc.) was added so that any water would be removed by azeotropic distillation, and the solvents distilled off under water vacuum (15–40 mm.). The red liquid (137 gms., 99%) which remained was induced to crystallize from ligroin. The recrystallized solid melted at 145–6° C.

Calcd. for $C_{30}H_{45}O_2N$: C, 79.77; H, 10.04; N, 3.10.
Found C, 79.59, 79.72; H, 10.57, 10.35; N, 3.17, 3.29.

(c) *N,N-bis-(4-hydroxy-3,5-dimethyl benzyl)-2-cyclohexylamine*

Cyclohexylamine (41 gms., 0.409 mol.) in methanol (100 cc.) was added dropwise to a methanol solution of formalin (66.5 gms., 0.815 mol. formaldehyde) with stirring and cooling. After one hour, a solution of 2,6-xylenol (100 gms., 0.818 mol.) was added with cooling and stirring. The solution was refluxed slowly overnight. The solvents were removed under water vacuum (15–40 mm.) and the product recrystallized from benzene. M. P. 175–6° C.

(d) *N,N-bis-(2-hydroxy-3-octyl-5-methyl benzyl)-cyclohexylamine*

Cyclohexylamine (22.6 gms., 0.227 mol.) was dissolved in 50 cc. of methanol and the solution added dropwise to formalin (39 gms., 0.454 mol. formaldehyde) in methanol (50 cc.) with stirring and cooling. o-Octyl-p-cresol (100 gms., 0.454 mol.) was then dissolved in methanol (200 cc.) and added to the above solution. The mixture was warmed overnight and the solvents removed under water vacuum (15-40 mm.). The resulting product was a very viscous oil.

EXAMPLE 2

In order to illustrate the use of N,N-bis-(hydroxy-dialkyl benzyl)-alkylamines in hevea, the following examples are given:

I. Samples were made up by milling the amines into the following stocks:

M. B. #1

| | |
|---|---|
| Pale crepe | 98.65 |
| Zinc oxide | 10.0 |
| Lithopone | 60.0 |
| Whiting | 60.0 |
| Zinc laurate | .5 |
| Sulfur | 3.0 |
| M. B. #2 | 1.5 |
| | 233.65 |

M. B. #2

| | |
|---|---|
| Pale crepe | 90.0 |
| Tetramethyl thiuram monosulfide | 10.0 |
| | 100.0 |

| | A | B | C | D | E | F | G |
|---|---|---|---|---|---|---|---|
| M. B. #1 | 233.65 | 233.65 | 233.65 | 233.65 | 233.65 | 233.65 | 233.65 |
| N,N-Bis-(4-hydroxy-3,5-dimethyl benzyl)-cyclohexylamine | 1.0 | | | | | | |
| N,N-Bis-(2-hydroxy-3-tert-butyl-5-methyl benzyl)-methylamine | | 1.0 | | | | | |
| N,N-Bis-(hydroxy-octyl-methyl benzyl)isopropylamine | | | 1.0 | | | | |
| N,N-Bis-(2-hydroxy-3-tert-butyl-5-methyl benzyl)-cyclohexylamine | | | | 1.0 | | | |
| N,N-Bis-(2-hydroxy-3-tert-butyl-5-methyl benzyl)-isopropylamine | | | | | 1.0 | | |
| Blank | | | | | | | |

The ingredients were combined on a rubber mill in the usual manner and cured 10, 20, and 30 minutes at the temperature of 30 pounds steam pressure. The overall percent tensile retained on aging for 24 hours at 212° F. and for 96 hours in the oxygen bomb were noted.

| Stock | Percent Tensile Retained | |
|---|---|---|
| | 24 hrs. at 212° F. | 96 hrs. in O₂ bomb |
| A | 48 | 70 |
| B | 48 | 33 |
| C | 67 | 74 |
| D | 66 | 26 |
| E | 64 | 27 |
| F | 39 | [1] 14 |
| G | 46 | [2] 28 |

[1] Control for A, B, D, E.
[2] Control for C.

EXAMPLE 3

In order to illustrate the use of these compounds as stabilizers for GR-S, the chemicals were put into GR-S latex containing only shortstop and flocculated by the acid-glue method. The crumb was washed and dried overnight at 80° C. The time for resinification at 100° C. and at 130° C. was then noted.

| | Res. (hrs.) | |
|---|---|---|
| | 130° C. | 100° C. |
| N,N-Bis-(2-hydroxy-3-tert-butyl-5-methyl benzyl)-cyclohexylamine | 3½ | 24 |
| N,N-Bis-(2-hydroxy-3-tert-butyl-5-methyl benzyl)-methylamine | 3½ | 48 |
| N,N-Bis-(hydroxy-octyl methyl benzyl)-isopropylamine | 3½ | 48 |
| Blank | ½ | 24 |

EXAMPLE 4

The chemicals of this invention showed great promise in protecting a GR-S against light deterioration. The chemicals were incorporated in the GR-S latex in the same way as in Example 3. They were then placed in a window having afternoon sunlight. The time for "cracking" to occur was noted. "Cracking" is a term used to describe the surface hardening of rubber on prolonged exposure to sunlight.

| | Time (weeks) |
|---|---|
| N,N-bis-(2-hydroxy-3-tert-butyl-5-methyl benzyl)-methylamine | 3 |
| N,N-bis-(2-hydroxy-3,5-ditert-butyl-6-methyl benzyl)-methylamine | 4 |
| N,N-bis-(hydroxy-octyl-methyl benzyl)-isopropylamine | 4 |
| Blank | 1 |

EXAMPLE 5

The chemicals of this invention also show great promise in protecting cured synthetic rubber. To demonstrate this, the N,N-bis-(hydroxy-octyl-methyl benzyl)-isopropylamine was milled into the following synthetic rubber compound.

M. B. #1

| | |
|---|---|
| GR-S (no stabilizer) | 100.0 |
| Cumar MH 2½ | 7.5 |
| Zinc oxide | 50.0 |
| Titanium dioxide | 25.0 |
| Clay | 60.0 |
| Magnesium oxide | 5.0 |
| Dibenzothiazole disulfide | 1.5 |
| Tetramethyl thiuram monosulfide | .25 |
| Sulfur | 4.0 |
| | 253.25 |

| | A | B |
|---|---|---|
| M. B. #1 | 253.25 | 253.25 |
| N,N-Bis-(hydroxy-octyl-methyl benzyl)-isopropylamine | | 1.25 |

Samples were cured for thirty, forty-five and sixty minutes at 291° F. They were then aged in the oxygen bomb at 80° C. The percent tensile retained is reported.

| Sample | Percent Tensile Retained, Hrs. in $O_2$ at 80° C. | |
|---|---|---|
| | 96 | 120 |
| A | 21 | 0 |
| B | 86 | 83 |

EXAMPLE 6

These chemicals were also found to give excellent light protection to a butadiene-acrylonitrile (65/35) polymer. In this case the compounds were incorporated (1.5 parts) into an unstabilized latex, flocculated with calcium chloride solution, washed and dried at 80° C. The samples were placed in the window (afternoon sunlight exposure) and the amount of surface "cracking" in one week was noted.

| | Surface Cracking [1] |
|---|---|
| Blank | 1 |
| N,N - Bis - (2 - hydroxy - 3 - tert - butyl - 5 - methyl benzyl)-methylamine | 3 |
| N,N - Bis - (hydroxy - octyl methyl benzyl) - isopropylamine | 3 |

[1] Surface cracking is graded on a basis of 1–10, 10 being a polymer with no cracking.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the antioxidant may vary from about 0.1% to 5%, although either smaller or greater proportions may be found useful. It the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surfaces of vulcanized or unvulcanized rubber goods.

Having thus described my invention, what I claim and desire to protect by Letters Patent is:

1. A method of preserving rubbers selected from the class consisting of natural and sulfur-vulcanizable unsaturated synthetic rubbers which are susceptible to deterioration by heat, light and oxygen which comprises incorporating therein an antioxidant proportion of an N,N-bis-(2-hydroxy-3,5-dialkyl benzyl)-alkylamine having the formula

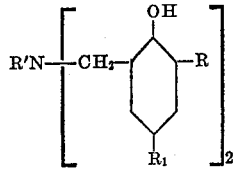

where R and $R_1$ each represent an alkyl radical; and R' is a member selected from the group consisting of alkyl, alkenyl, cycloalkyl, and hydroxy alkyl.

2. A method of preserving rubbers selected from the class consisting of natural and sulfur-vulcanizable unsaturated synthetic rubbers which are susceptible to deterioration by heat, light and oxygen which comprises incorporating therein an antioxidant proportion of an N,N-Bis-(2-hydroxy-3-tert-butyl-5-methyl benzyl)-methylamine.

3. A method of preserving rubbers selected from the class consisting of natural and sulfur-vulcanizable unsaturated synthetic rubbers which are susceptible to deterioration by heat, light and oxygen which comprises incorporating therein an antioxidant proportion of an N,N-Bis- (2 - hydroxy - 3 - tert - butyl - 5 - methyl benzyl) - cyclohexylamine.

4. A method of preserving rubbers selected from the class consisting of natural and sulfur-vulcanizable unsaturated synthetic rubbers which are susceptible to deterioration by heat, light and oxygen which comprises incorporating therein an antioxidant proportion of an N,N-Bis- (4-hydroxy-3,5-dimethyl benzyl)-2-cyclohexylamine.

5. A method of preserving rubbers selected from the class consisting of natural and sulfur-vulcanizable unsaturated synthetic rubbers which are susceptible to deterioration by heat, light and oxygen which comprises incorporating therein an antioxidant proportion of an N,N-Bis- (2-hydroxy - 3 - tert - octyl-5-methyl benzyl)-cyclohexylamine.

6. A method of preserving rubbers selected from the class consisting of natural and sulfur-vulcanizable unsaturated synthetic rubbers which are susceptible to deterioration by heat, light and oxygen which comprises incorporating therein an antioxidant proportion of an N,N-Bis-(2-hydroxy-3-tert-butyl-5-methyl benzyl)-isopropylamine.

References Cited in the file of this patent

UNITED STATES PATENTS

| 1,924,979 | Calcott et al. | Aug. 29, 1933 |
| 1,950,478 | Calcott et al. | Mar. 13, 1934 |
| 2,131,206 | Williams et al. | Sept. 27, 1938 |